(12) United States Patent
Riva (10) Patent No.: US 11,292,407 B2
(45) Date of Patent: Apr. 5, 2022

(54) POLYMER ELEMENT FOR ABSORBING IMPACT FOR A VEHICLE AND BUMPER STRUCTURE

(71) Applicant: SRT S.R.L., Lissone (IT)

(72) Inventor: Alessandro Riva, Arese (IT)

(73) Assignee: SRT S.R.L., Lissone (IT)

( * ) Notice: Subject to any disclaimer, the term of this patent is extended or adjusted under 35 U.S.C. 154(b) by 50 days.

(21) Appl. No.: 16/645,608

(22) PCT Filed: Sep. 13, 2018

(86) PCT No.: PCT/IB2018/056994
§ 371 (c)(1),
(2) Date: Mar. 9, 2020

(87) PCT Pub. No.: WO2019/053621
PCT Pub. Date: Mar. 21, 2019

(65) Prior Publication Data
US 2020/0276951 A1 Sep. 3, 2020

(30) Foreign Application Priority Data
Sep. 15, 2017 (IT) .................. 102017000103763

(51) Int. Cl.
*B60J 7/00* (2006.01)
*B60R 19/18* (2006.01)
(Continued)

(52) U.S. Cl.
CPC ............ *B60R 19/18* (2013.01); *B60R 19/483* (2013.01); *B60D 1/04* (2013.01); *B60R 2019/1866* (2013.01)

(58) Field of Classification Search
CPC .......... B32B 2307/558; B32B 2307/56; C08G 18/10; B60R 21/04; A63B 71/10;
(Continued)

(56) References Cited

U.S. PATENT DOCUMENTS 3,366,530 A * 1/1968 Momir ............... B29D 99/0089
428/116
3,897,095 A * 7/1975 Glance .................... B60R 19/18
293/120
(Continued)

FOREIGN PATENT DOCUMENTS

| EP | 1065108 A2 | 1/2001 |
| WO | 2012014091 A1 | 2/2012 |
| WO | 2014125400 A2 | 8/2014 |

OTHER PUBLICATIONS

International Search Report and Written Opinion dated Nov. 12, 2018 re: Application No. PCT/IB2018/056994, pp. 1-14, US 2012/0112479 A1, WO 2012/014091 A1, EP 1 065 108 A2 and WO 2014/125400 A2.

*Primary Examiner* — Kiran B Patel
(74) *Attorney, Agent, or Firm* — Element IP, PLC (57) ABSTRACT

A polymer spacer element for absorbing impact for an engine-powered vehicle includes an open front extremity and a rear extremity, and a honeycomb structure having channels made in a single piece and at least three channels each of which extends from the first open front extremity towards the second rear extremity. In addition, each channel of the channels is tapered from the first open front extremity towards the second rear extremity or vice-versa and presents an inner rake angle. In addition, each channel includes an elevation and a transversal section having a polygon shape that is regular or irregular, in which the transversal section has an equivalent lateral dimension equal to a diameter of a circumference having minimum diameter which circumscribes the transversal section of each corresponding channel. Each channel presents a ratio between the elevation and the transversal dimension which is lower than or equal to three.

14 Claims, 5 Drawing Sheets

(51) Int. Cl.
*B60R 19/48* (2006.01)
*B60D 1/04* (2006.01)

(58) Field of Classification Search
CPC ...... B29C 66/71; C08L 2666/02; C08L 53/00; C08F 2500/03; C08F 2500/17
See application file for complete search history.

(56) References Cited

U.S. PATENT DOCUMENTS

| | | | | |
|---|---|---|---|---|
| 4,022,505 | A * | 5/1977 | Saczawa, Jr. | B60R 19/18 293/120 |
| 5,030,501 | A * | 7/1991 | Colvin | B65D 65/406 428/178 |
| 5,425,561 | A * | 6/1995 | Morgan | B60R 19/18 293/120 |
| 5,518,802 | A * | 5/1996 | Colvin | B32B 3/12 428/166 |
| 5,618,633 | A * | 4/1997 | Swanson | B22C 9/04 428/593 |
| 6,099,055 | A * | 8/2000 | Hirota | B60R 19/18 293/120 |
| 8,215,686 | B2 * | 7/2012 | Czopek | B60R 19/18 293/133 |
| D670,217 | S * | 11/2012 | Bobba | B60R 19/18 D12/196 |
| 8,354,175 | B2 * | 1/2013 | Impero | F16F 7/121 428/593 |
| D696,169 | S * | 12/2013 | Mana | D12/172 |
| 8,715,806 | B2 * | 5/2014 | Diderich | B65D 81/127 428/116 |
| 8,793,821 | B2 * | 8/2014 | Fowkes | A47K 3/002 4/579 |
| D731,382 | S * | 6/2015 | Mana | D12/196 |
| D777,071 | S * | 1/2017 | Mana | D12/196 |
| 9,649,823 | B2 * | 5/2017 | Prud'homme | B32B 37/146 |
| 9,845,600 | B2 * | 12/2017 | Sypeck | B32B 3/26 |
| 10,065,682 | B1 * | 9/2018 | Tyan | B62D 25/00 |
| D830,263 | S * | 10/2018 | Mana | D12/196 |
| 10,099,639 | B1 * | 10/2018 | Faruque | B60R 19/18 |
| 10,300,947 | B2 * | 5/2019 | Tyan | B60R 16/0215 |
| 2002/0121787 | A1 * | 9/2002 | Tarahomi | B60R 19/18 293/120 |
| 2002/0149214 | A1 * | 10/2002 | Evans | B60R 19/18 293/120 |
| 2003/0189343 | A1 * | 10/2003 | Evans | B60R 19/18 293/120 |
| 2003/0218326 | A1 * | 11/2003 | Banyas | F16F 7/121 280/777 |
| 2004/0036302 | A1 * | 2/2004 | Shuler | B60R 19/18 293/120 |
| 2004/0094977 | A1 * | 5/2004 | Shuler | B60R 19/18 293/133 |
| 2004/0174025 | A1 * | 9/2004 | Converse | B60R 19/18 293/133 |
| 2005/0057053 | A1 * | 3/2005 | Evans | B60R 19/18 293/133 |
| 2005/0087997 | A1 * | 4/2005 | Zander | B29C 44/60 293/102 |
| 2005/0089674 | A1 * | 4/2005 | Zander | B29C 44/421 428/158 |
| 2006/0125250 | A1 * | 6/2006 | Evans | B60R 19/12 293/121 |
| 2007/0228746 | A1 * | 10/2007 | Cormier | B60R 21/04 293/102 |
| 2007/0257497 | A1 * | 11/2007 | Heatherington | B60R 19/18 293/120 |
| 2009/0250953 | A1 * | 10/2009 | Perucca | B60R 19/18 293/132 |
| 2010/0127533 | A1 * | 5/2010 | Gonin | B60R 19/18 296/193.09 |
| 2011/0015902 | A1 * | 1/2011 | Cheng | F16F 7/128 703/1 |
| 2011/0024250 | A1 * | 2/2011 | Kitashiba | F16F 7/121 188/376 |
| 2011/0272954 | A1 * | 11/2011 | Gonin | B62D 25/08 293/120 |
| 2012/0112479 | A1 * | 5/2012 | Nagwanshi | F16F 7/121 293/133 |
| 2012/0125726 | A1 * | 5/2012 | Langhorst | F16F 9/30 188/266 |
| 2012/0261949 | A1 * | 10/2012 | Tyan | B60R 19/34 296/187.03 |
| 2013/0175813 | A1 * | 7/2013 | Mana | B60R 19/18 293/120 |
| 2013/0193698 | A1 * | 8/2013 | Nagwanshi | B60R 19/18 293/120 |
| 2014/0042758 | A1 * | 2/2014 | Buron | F16F 7/121 293/133 |
| 2014/0203592 | A1 * | 7/2014 | Nagwanshi | B62D 29/001 296/187.01 |
| 2015/0084374 | A1 * | 3/2015 | Tyan | B62D 21/15 296/187.03 |
| 2016/0332410 | A1 * | 11/2016 | Brun | B32B 7/14 |
| 2016/0353825 | A1 * | 12/2016 | Bottlang | B33Y 80/00 |
| 2016/0375935 | A1 * | 12/2016 | Tyan | B62D 21/02 296/205 |
| 2017/0113724 | A1 * | 4/2017 | Tyan | B62D 21/15 |
| 2017/0182959 | A1 * | 6/2017 | Bobba | F16F 7/12 |
| 2017/0203708 | A1 * | 7/2017 | Jaradi | B33Y 80/00 |
| 2017/0253204 | A1 * | 9/2017 | Venkat | B60R 19/18 |
| 2017/0274933 | A1 * | 9/2017 | Tyan | B62D 21/152 |
| 2017/0307137 | A1 * | 10/2017 | Tyan | B32B 25/08 |
| 2017/0307138 | A1 * | 10/2017 | Tyan | B32B 15/18 |
| 2018/0057060 | A1 * | 3/2018 | Tyan | B32B 25/06 |
| 2018/0057063 | A1 * | 3/2018 | Tyan | B62D 25/00 |
| 2018/0058530 | A1 * | 3/2018 | Tyan | B32B 15/14 |
| 2018/0099475 | A1 * | 4/2018 | Tyan | B32B 27/065 |
| 2018/0100621 | A1 * | 4/2018 | Tyan | B32B 5/245 |
| 2018/0141512 | A1 * | 5/2018 | Munjurulimana | B60R 19/18 |
| 2018/0215331 | A1 * | 8/2018 | Gumpina | B60R 19/18 |
| 2019/0039541 | A1 * | 2/2019 | Tyan | B60R 19/18 |
| 2019/0263342 | A1 * | 8/2019 | Rodgers | F16F 7/12 |
| 2019/0264769 | A1 * | 8/2019 | Gergely | F16F 7/003 |
| 2019/0359158 | A1 * | 11/2019 | Faruque | B60R 19/03 |
| 2020/0180535 | A1 * | 6/2020 | Kito | C08L 77/02 |
| 2020/0361175 | A1 * | 11/2020 | Gan | B32B 3/085 |

* cited by examiner

POLYMER ELEMENT FOR ABSORBING IMPACT FOR A VEHICLE AND BUMPER STRUCTURE

TECHNICAL FIELD

The present disclosure refers to a polymer spacer element for absorbing impact for a vehicle which can be applied in the automobile industry and in particular able to be used as spacer and sacrificial element in a bumper structure, preferably front or rear, of an engine-powered vehicle.

BACKGROUND

The polymer elements for absorbing impact for front or rear bumper structures are capable of absorbing very high impact forces, and indeed they are designed to absorb an impact energy of over 15000 J or in particular over 6000 J.

These elements for absorbing impact present very high collapse forces and are connected to the ends of a bumper beam which is part of a front or rear bumper structure.

A first drawback is that the polymer elements for absorbing impact have a high collapse force, and therefore are not capable of absorbing low-energy impacts in which the impact force is much lower than the minimum collapse force of the lower polymer elements for absorbing impact.

The front or rear bumper structures also comprise spacer elements made of polymer foams which are fixed centrally to said bumper beam to absorb low-energy impacts.

Said polymer foams indeed present an initially low collapse force which however increases exponentially with the degree of longitudinal compression of the spacer elements.

Polymer foams are usually mounted frontally in the bumper structure of vehicles, in case of a front impact, with consequent compression during a front impact.

Another drawback is that said spacer elements made of polymer foams, even if they present a comparable collapse force to the impact force of low-energy impacts, are not capable of completely absorbing the energy of the impact.

Indeed, polymer foams during said low-energy impact, by compressing, increase their rigidity and thus also the instantaneous collapse force, and consequently are able to absorb only 40% of a low-energy impact.

Indeed, when the compression of a polymer foam is above 60% of its thickness measured in a longitudinal direction, said polymer foam becomes very stiff and is no longer capable of absorbing even low-energy impacts, which are of the order of 1000 J.

Therefore, 60% of the low-energy impact is transmitted to the vehicle, damaging the components of the vehicle and in some cases even compromising the functionality of one or more components of the vehicle or of the entire vehicle itself like in the case in which the component has an essential function, like for example the radiator which, when broken or perforated during an impact, would need the vehicle to be quickly stopped in order to prevent the bushings or cylinder head from melting or to prevent the engine itself from seizing.

Another drawback is that in order to completely absorb low-energy impacts it would be necessary to have spacer elements made of polymer foams and having very high thicknesses, which would increase the longitudinal dimension of the vehicle and which in terms of the design of the vehicle are unacceptable.

Known bumper structures having at least two polymer elements for absorbing impact also comprise a crossbeam that extends between said at least two polymer elements for absorbing impact, and also comprise an outer polymer bumper casing having a purely aesthetic function that covers said polymer crossbeam and said at least two polymer elements for absorbing impact.

The polymer elements for absorbing impact in particular present a substantially honeycomb-like structure which makes it possible to absorb a portion of kinetic energy due to an impact of the engine-powered vehicle against a fixed or moving obstacle.

Each polymer element for absorbing impact is positioned close to said bumper beam and is positioned between it and a frame of said engine-powered vehicle so as to absorb a part of the kinetic energy during said impact, consequently reducing the kinetic energy transmitted to said frame.

Furthermore, in particular in the case of a frontal impact with a pedestrian, the crossbeam, being very stiff, causes a lot of damage to the pedestrian often causing permanent damage to the his/her knees.

Another drawback is that in the case of the bumper beam giving way, the correct stressing of the elements for absorbing impact is compromised and consequently so is their correct operation.

SUMMARY

The present disclosure refers to a bumper structure in particular for a means of transport like for example an engine-powered vehicle.

The present disclosure refers to a type of bumper structure having at least two polymer elements for absorbing impact and at least one spacer element for absorbing impact.

The purpose of the present disclosure is to make a polymer spacer element for absorbing impact for a vehicle that makes it possible to completely absorb a low-energy impact while at the same time keeping the space occupied low.

Another purpose is to make a polymer spacer element for absorbing impact for a vehicle that makes it possible to completely absorb a low-energy impact while at the same time keeping the space occupied low in particular along a longitudinal direction.

Another purpose is to make a polymer spacer element for absorbing impact for a vehicle that makes it possible to reduce the overall weight of the bumper structure and that at the same time makes it possible to reduce the impact force transmitted to a frame of the vehicle to the minimum.

Another purpose is to make a polymer spacer element for absorbing impact for a vehicle that makes it possible to reduce the production costs and that makes it possible to obtain a collapse force that is substantially constant during an impact, at the same time maintaining a high stability of a bumper beam.

Another purpose is to make a polymer spacer element for absorbing impact for a vehicle that allows a high reduction of the cost and that allows easy assembly and mounting thereof in a bumper structure.

Yet another purpose is to make a bumper structure for a vehicle that makes it possible to reduce the production costs and that also makes it possible to reduce the damage to a pedestrian in the case of a frontal impact with the same to the minimum, at the same time maintaining a high stiffness of the bumper structure during the impact.

A further purpose is to be able to have a polymer spacer element for absorbing impact and a bumper structure for a vehicle that are easy to make and that are economically advantageous.

These purposes according to the present disclosure are accomplished by making a polymer spacer element for absorbing impact for a vehicle and a bumper structure as outlined in the claims.

Further characteristics of the disclosure are highlighted by the following claims.

BRIEF DESCRIPTION OF THE DRAWINGS

The characteristics and advantages of a polymer spacer element for absorbing impact for a vehicle and of a bumper structure according to the present disclosure will become clearer from the following description, given as an example and not for limiting purposes, referring to the attached schematic drawings, in which.

DETAILED DESCRIPTION OF THE DRAWINGS

With reference to the figures, a polymer spacer element for absorbing impact 10 for an engine-powered vehicle, made of a polymer material in particular having high elastic modulus and having a first open front extremity 12 and a second rear extremity 14, is shown.

Figure 1:
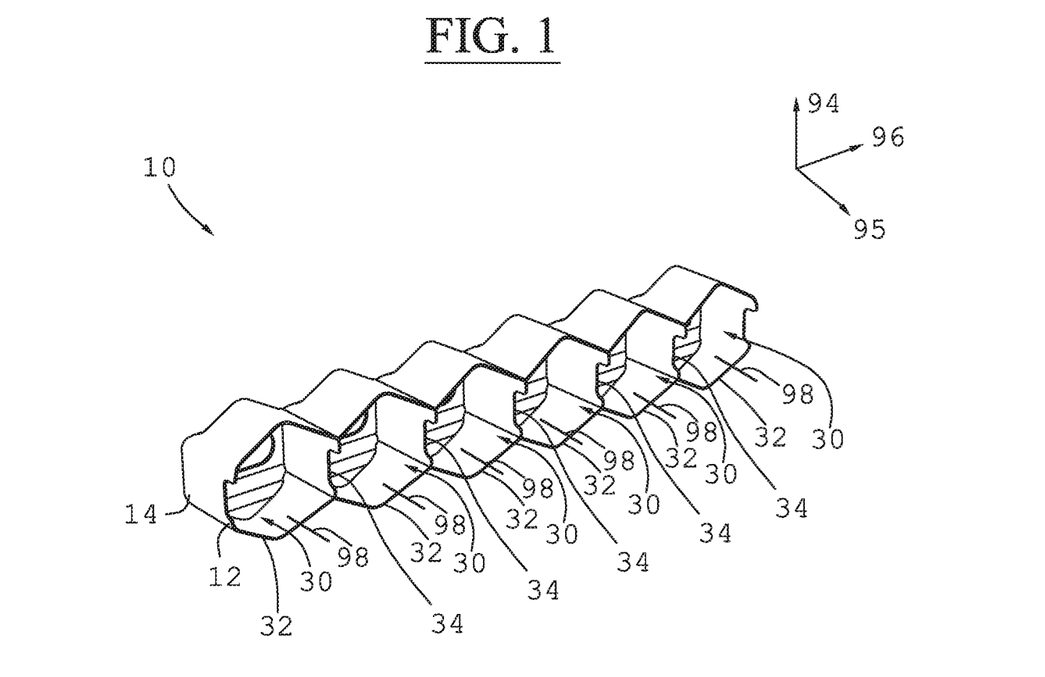
FIG. 1 is a left side elevational perspective view from above of a preferred embodiment of a polymer spacer element for absorbing impact according to the present disclosure.
Figure 2:
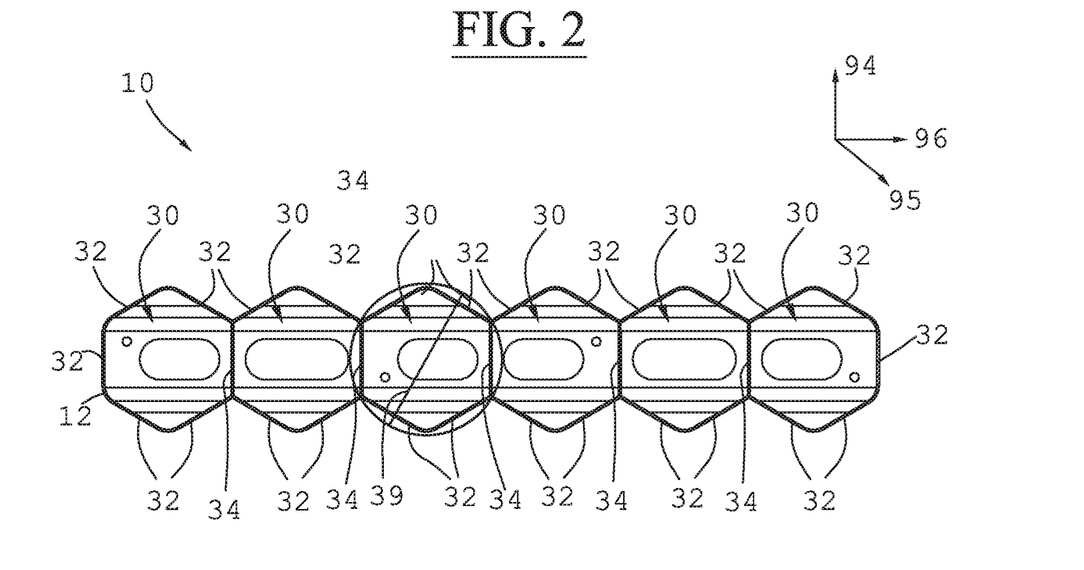
FIG. 2 is a front elevational view of the polymer spacer element for absorbing impact of FIG. 1.
Figure 3:
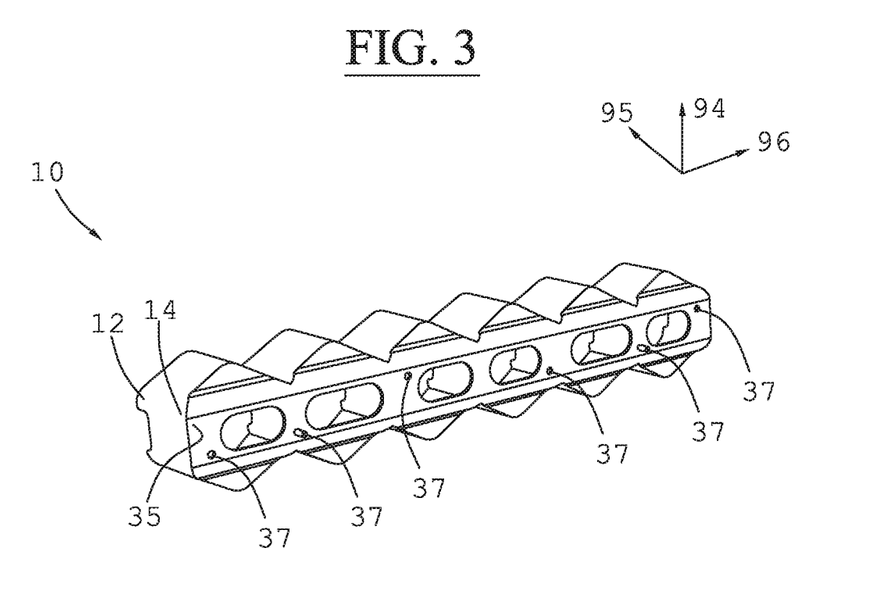
FIG. 3 is a left side elevational perspective view from behind of the polymer spacer element for absorbing impact of FIG. 1.
Figure 4:
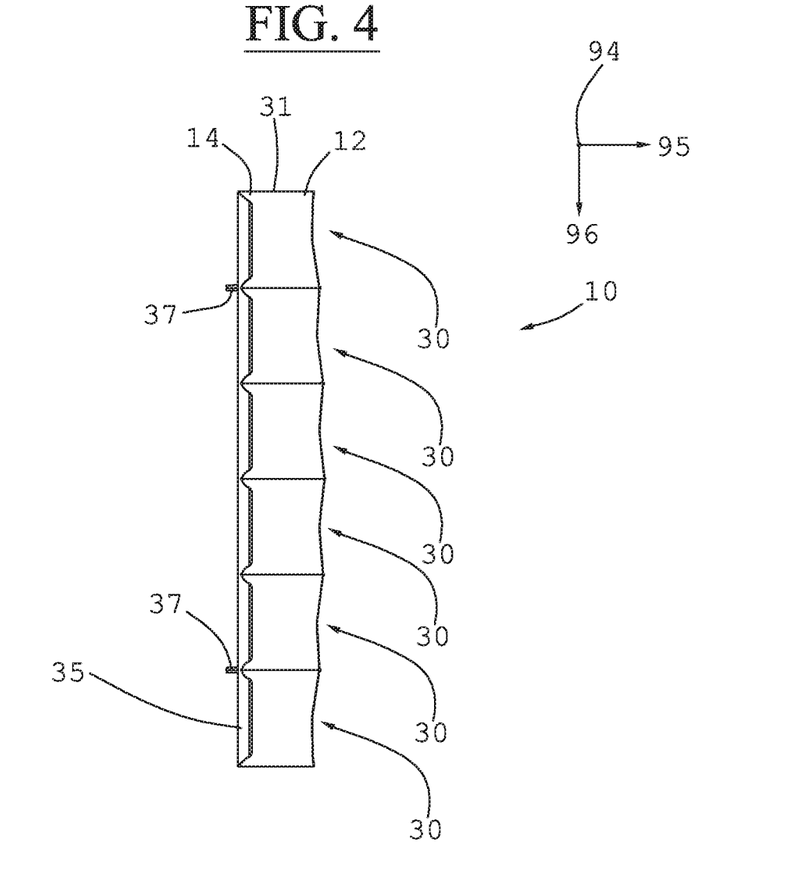
FIG. 4 is a view from above of the polymer spacer element for absorbing impact of FIG. 1.
Figure 5:
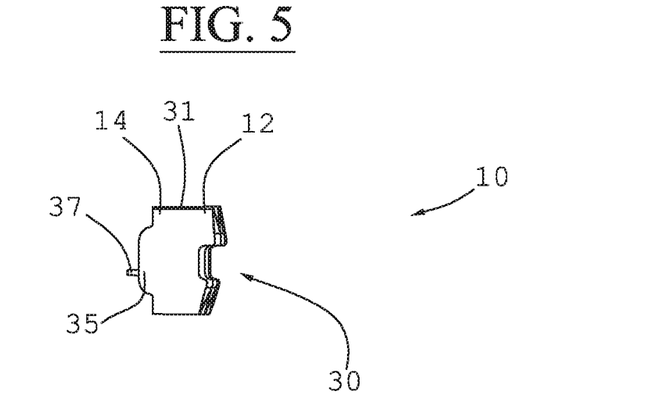
FIG. 5 is a left side elevational perspective view of the polymer spacer element for absorbing impact of FIG. 1.
Figure 6:
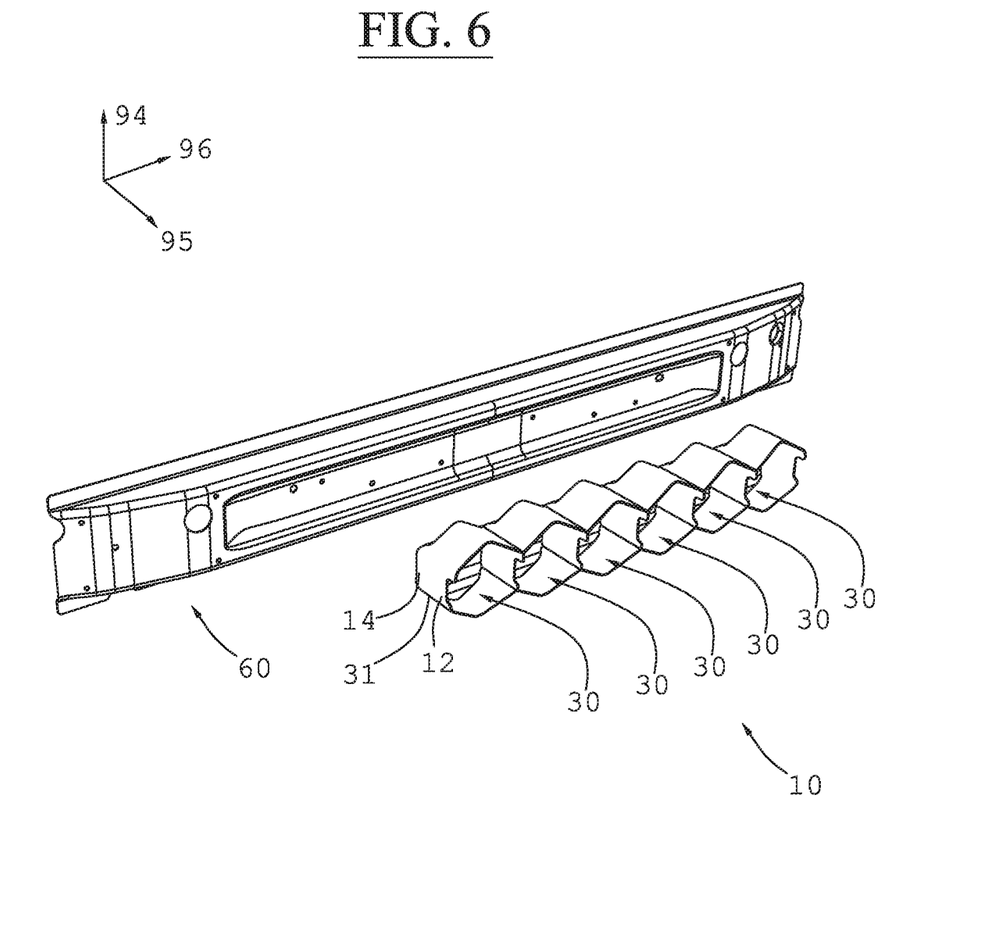
FIG. 6 is an exploded left side elevational perspective view from above of a bumper structure of a preferred embodiment according to the present disclosure.
Figure 7:
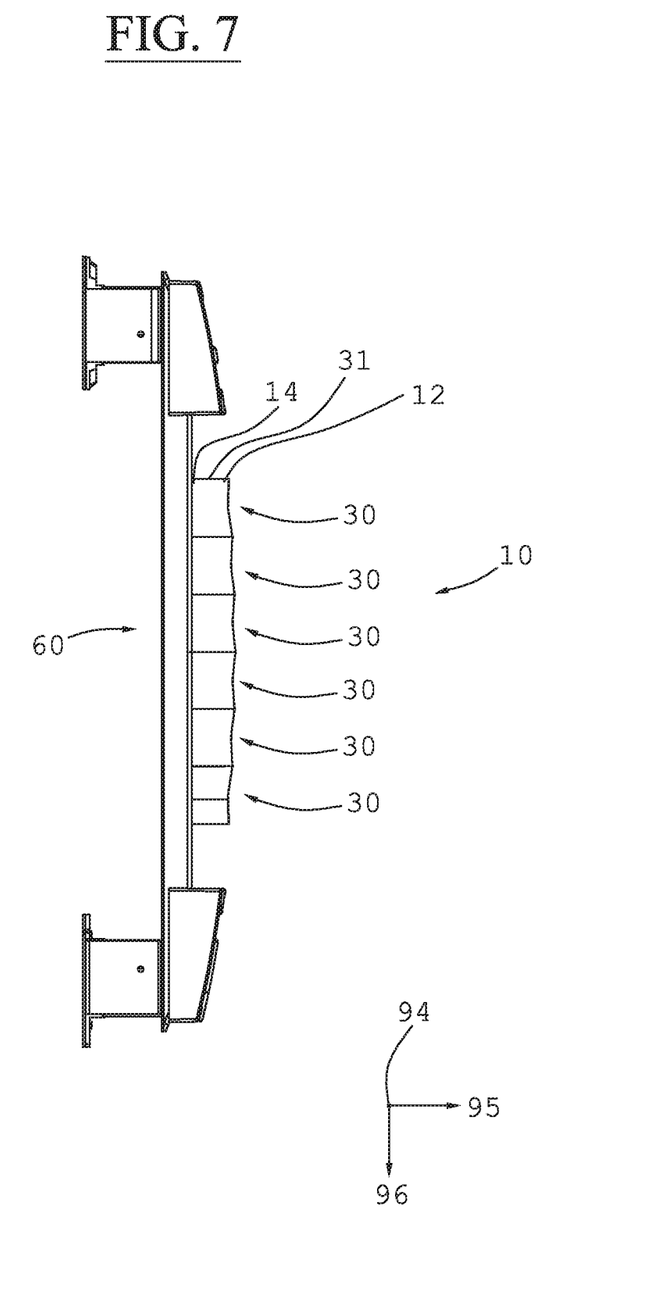
FIG. 7 is a view from above of a preferred embodiment of a bumper structure according to the present disclosure.

According to the present disclosure said polymer spacer element for absorbing impact 10 comprises a honeycomb structure having a plurality of channels 30 made in a single piece, and in particular comprising at least three channels 30, each of which extends from said first open front extremity 12 towards said second rear extremity 14 or vice-versa; in addition, each channel 30 of said plurality of channels 30 is tapered from said first open front extremity 12 towards said second rear extremity 14 or vice-versa and preferably presents an inner rake angle; in addition each channel 30 comprises an elevation 31 and a transversal section having a polygon shape that is regular or irregular, in which said transversal section comprises an equivalent lateral dimension equal to a diameter 39 of the circumference having minimum diameter which circumscribes said transversal section of each corresponding channel 30, as shown in FIG. 2.

According to the present disclosure each channel 30 presents a ratio between said elevation 31 and said equivalent lateral dimension which is lower than or equal to 3 and in particular lower than or equal to 2 and even more in particular lower than 1.5.

In particular said elevation 31 is lower than said equivalent lateral dimension.

For example, each channel 30 presents an equivalent lateral dimension greater than 8 cm, in particular greater than 9 cm, and an elevation 31 greater than 4 or 5 cm, in particular greater than 10 cm.

Furthermore, preferably, each channel 30 comprises a plurality of walls (32,34) each having a thickness comprised between 0.6 and 4 mm, in particular between 0.7 and 1.5 mm; in addition, said thickness is preferably proportional to said ratio between said elevation 31 and said equivalent lateral dimension.

Advantageously, in this way it is possible to have a plurality of channels 30 made in a single piece and in which each channel 30 has a low elevation 31 in particular comprised between 5 cm and 13 cm, and therefore a low equivalent lateral dimension along a longitudinal direction 95; in addition, consequently, each channel 30 has a transversally wide channel advantageously to distribute the force of said impact over a larger surface, consequently reducing the stress associated with said force of said impact.

Preferably, all of the channels 30 of said plurality of channels 30 have the same elevation 31 which is in particular comprised between 5 cm and 13 cm.

This is advantageous in particular in the case of an impact force concentrated over a small surface like for example an impact against a pedestrian or against a post.

Furthermore, this makes it possible to have a constant collapse force during the first moments of the impact.

Preferably, said plurality of channels 30 is aligned in series along a preferably straight or curved line, in particular along two lines that are equidistant from one another and in particular parallel, to form a linear matrix of channels 30, in particular a matrix 1×n or 2×n of channels 30, or preferably a matrix m×n of channels 30, in particular a linear matrix 1×n or 2×n of channels 30 with n greater than or equal to 3, in particular with n greater than or equal to 6, and even more in particular with n greater than or equal to 12.

Preferably, each channel 30 comprises at most four channels 30 adjacent to it, in particular at most two channels 30 adjacent to it and preferably arranged on opposite sides, like for example in FIGS. 1 to 5.

Preferably, each channel 30 comprises a free inner volume for housing elements or devices, such as in particular a towing hook or a parking sensor or a radar or a camera, and for insertion into or for the passage of wires or power cables or data cables or control and/or command signals through at least a specified channel 30, advantageously preventing them from being able to change the bending and operating dynamics of said spacer element for absorbing impact 10.

Preferably, said free volume of each channel 30 is preferably partially filled with a polymer foam for absorbing the energy of an impact, like in particular a polypropylene foam or polyurethane foam or similar to them or their derivatives, to increase and modulate the collapse force of said polymer spacer element for absorbing impact 10 preferably for different models of vehicle or to respect further safety requirements.

Preferably said polymer spacer element for absorbing impact 10 comprises a rear base wall 35 for stiffening and stabilising said second rear extremity 14 and for fixing said polymer spacer element for absorbing impact 10 frontally to a bumper beam 60.

Advantageously, this also allows an exchange of stresses between said plurality of channels 30 further increasing the absorption of impact energy, keeping a low collapse force.

Preferably, said rear base wall 35 is made in a single piece with said plurality of channels 30 at said second rear extremity 14, and in addition said rear base wall 35 comprises at least one opening at at least one channel 30, in particular at each channel 30, advantageously to allow the passage of cables for systems and other components, like for example a towing hook or a plurality of parking sensors, at the same time avoiding a change of the bending dynamics of said polymer spacer element for absorbing impact 10.

Advantageously, this also allows the passage of air in particular towards a radiator, avoiding having to increase the surface thereof.

Preferably, said second rear extremity 14 is open and comprises at least one opening in each channel 30 of said plurality of channels 30.

In the case of discontinuous bumper structures the collapse force can vary by 40% depending on the portion of the bumper structure that is engaged by the impact.

In the case of the present disclosure, preferably said polymer spacer element for absorbing impact 10 is continuous and can be fixed frontally to a bumper beam 60, preferably front or rear.

Preferably, said polymer spacer element for absorbing impact 10 comprises rear fixing means for fixing it frontally to a bumper beam 60, preferably front or rear.

Preferably, said rear fixing means are positioned at said second rear extremity 14.

In particular, said rear fixing means are selected among pins, holes for fixing rivets or similar, screws, bushes.

Preferably, said rear fixing means comprise a plurality of holes and/or pins 37 made in one piece with said polymer spacer element for absorbing impact 10 and in particular made in a single piece with said rear base wall 35.

Preferably, said polymer spacer element for absorbing impact 10 comprises a transversal section which comprises an outer perimeter having an upper and/or lower portion that is corrugated, in particular with a substantially sinusoidal shape, for stabilising said polymer spacer element for absorbing impact 10 and for absorbing greater energy during an impact and at the same time for reducing the collapse force.

In particular, said outer perimeter of said transversal section comprises an upper and/or lower portion that is corrugated with a substantially sinusoidal shape, in which said substantially sinusoidal shape has a period of repetition of the wave roughly equal to said equivalent lateral dimension 39.

In addition, advantageously, this makes it possible to increase the equivalent diameter for the same space occupied along a vertical direction 94.

Preferably, said plurality of channels 30 is oriented substantially along a longitudinal direction 95 which is orthogonal to a transversal direction 96 which is orthogonal to a vertical direction 94 which is orthogonal to said longitudinal direction 95 and to said transversal direction 96.

Preferably, said plurality of walls (32,34) comprises a plurality of outer lateral walls 32, each of which belongs only to a corresponding channel 30, and in addition comprises a plurality of inner lateral walls 34 each of which is common to at least two adjacent channels 30.

In particular, said plurality of outer lateral walls 32 defines an outer perimeter of a transversal section of said polymer spacer element for absorbing impact 10.

In particular, at least a part of said plurality of outer lateral walls 32 protrudes above and/or below with respect to said vertical direction 94, and in addition, in particular at least one part of outer lateral walls 32 are united to each other with a connecting radius greater than 5 mm and in particular greater than 10 mm, preferably both externally and internally, advantageously to evenly distribute an impact concentrated over a plurality of channels 30 and preferably also over a larger surface, and also advantageously to reduce the dimension in the vertical direction 94 of said polymer spacer element for absorbing impact 10.

In particular, said plurality of channels 30 are wide and stumpy, and also have stable dynamic behaviour, in other words said polymer spacer element for absorbing impact 10 during an impact does not tilt and does not bend, but said plurality of channels 30 continues to fold onto itself without creating an instability of said structure.

In addition, preferably said plurality of outer lateral walls 32 of said plurality of channels 30 has a lateral surface greater than 400 cm2, in particular greater than 600 cm2 and preferably greater than 900 cm2, to better distribute the stresses of said impact in particular over a crossbeam 60.

In addition, in particular each wall of said plurality of walls (32,34) has a thickness lower than 3 mm and preferably lower than 1.5 mm, and in which in particular said thickness is directly proportional to said equivalent lateral dimension.

Advantageously, this allows a low collapse force for said polymer spacer element for absorbing impact 10, i.e. lower than the impact force of a low-energy impact; in addition, also during said impact said collapse force does not increase exponentially like in the case of polymer foams, and in addition from the studies carried out said spacer element for absorbing impact 10 makes it possible to absorb up to 80% of the energy of a low-energy impact, avoiding the damages that are caused in the case of spacer elements made of polymer foams.

Preferably, each channel 30 has a transversal section substantially polygonal in shape, preferably regular and in particular said transversal section of each channel has a substantially hexagonal, or square, or triangular or pentagonal shape, and in particular having rounded corners.

In particular each channel 30 comprises a substantially hexagonal transversal section preferably having rounded corners to better distribute the stresses over adjacent channels 30, avoiding an intensification of the stresses and stabilising the operation of said polymer spacer element for absorbing impact 10.

Preferably, said polymer spacer element for absorbing impact 10 is made of a polymer material having an ultimate elongation greater than 50%, and in particular greater than 150%, of the initial length of the sample that undergoes a tensile test, and in which said polymer material is in particular selected among polypropylene, polyethylene, thermosetting polyurethane or thermoplastic rubber, polymer alloy of a polycarbonate with an ABS polymer or with polybutylene terephthalate, an alloy with a polybutylene base, an alloy with a polybutylene terephthalate base.

Preferably, said low impact energy is lower than 1500 J or in particular lower than 600 J.

Preferably said high impact energy is greater than 3000 J or in particular greater than 6000 J.

According to another aspect of the present disclosure a bumper structure, front or rear in particular, for a vehicle is provided comprising at least two polymer elements for absorbing impact and also comprising a polymer spacer element for absorbing impact 10 of the type described above, a crossbeam 60, preferably metallic and having in particular a substantially "Ω"-shaped transversal section, and an outer polymer bumper casing, not shown in the figures, only having an aesthetic function which covers said crossbeam 60.

Said polymer spacer element for absorbing impact 10 is positioned between said crossbeam 60 and said outer bumper casing to be compressed between them and to at least partially absorb the energy of an impact, preferably at low speed like for example against a pedestrian, and to externally stiffen said crossbeam 60 and to evenly distribute an impact force, reducing the stress and keeping a low weight of said bumper structure or reducing the weight thereof.

In particular, the polymer spacer element for absorbing impact 10 extends frontally along said preferably metallic crossbeam 60 to at least partially absorb an axial impact and to distribute the remaining stress of said impact over a larger surface of said preferably metallic crossbeam 60.

Advantageously, this makes it possible to have a constant collapse force during the first moments of the impact and to have a smaller longitudinal dimension.

Preferably, said polymer spacer element for absorbing impact 10 is integrated, and in particular made in a single piece, with at least one polymer element for absorbing impact of said at least two polymer elements for absorbing impact each of which has a compact honeycomb structure and each of which is capable of partially absorbing an impact force of at least 10 tonnes.

According to another aspect of the present disclosure an apparatus is provided comprising at least one mould, and in particular a plurality of moulds, for serial production of said polymer spacer element for absorbing impact 10 of the type described above, and in particular said bumper structure of the type described above.

According to another aspect of the present disclosure an engine-powered vehicle is provided comprising at least one polymer spacer element for absorbing impact 10 of the type described above, and in particular comprising a bumper structure of the type described above.

In particular said engine-powered vehicle also comprises a frame to which said bumper structure is fixed, an engine, a passenger compartment and at least three wheels.

Preferably, said engine-powered vehicle is oriented along a longitudinal direction 95 which is orthogonal to a transversal direction 96 which is orthogonal to a vertical direction 94 which is orthogonal to said longitudinal direction 95 and to said transversal direction 96.

It has thus been seen that a polymer spacer element for absorbing impact for a vehicle and a bumper structure according to the present disclosure achieve the purposes highlighted earlier.

The polymer spacer element for absorbing impact for a vehicle and the bumper structure of the present disclosure thus conceived can undergo numerous modifications and variants, all of which are encompassed by the same inventive concept.

Furthermore, in practice the materials used, as well as their sizes and the components, can be whatever according to the technical requirements.

The invention claimed is:

1. A spacer element for absorbing impact for an engine-powered vehicle, the spacer element comprising:
   a unitary piece of polymeric material having a honeycomb structure;
   wherein:
   the honeycomb structure comprises at least three channels;
   each channel is open at a front end of the spacer element;
   each channel has an elevation, which is a length of the channel in a front-to-back direction;
   each channel has a polygonal or substantially polygonal shape when viewed from the front of the spacer element;
   the polygonal shape of each channel has a diameter, which is a diameter of a smallest circle that circumscribes the polygonal shape;
   for each channel, a ratio of the elevation to the diameter is 3 or less;
   a cross sectional area of each channel tapers along at least a portion of its length in the front-to-back direction or a back-to-front direction to provide an inner rake angle;
   at least one of an upper surface and a lower surface of the spacer element is corrugated to stabilize the spacer element, absorb greater energy during impact, and reduce collapsing force at the same time during use;
   the at least one corrugated surface has a substantially sinusoidal shape when viewed from the front of the spacer element; and
   a period of the sinusoidal shape corresponds roughly to the diameters of the channels.

2. The spacer element of claim 1, wherein:
   walls forming each channel have a thickness of 0.6 to 4 mm; and
   the thickness of walls for each channel is proportional to the respective ratio of the elevation to the diameter.

3. The spacer element of claim 1, comprising at least two parallel rows of channels as viewed from the front of the spacer element.

4. The spacer element of claim 1, wherein an inner volume of each channel is configured to accommodate at least one element or device selected from the group consisting of a towing hook, a parking sensor, a radar, a camera, a wire, a power cable, and a data cable.

5. The spacer element of claim 4, wherein the inner volume of each channel is partially filled with a polymer foam.

6. The spacer element of claim 1, wherein:
   the honeycomb structure comprises a rear base wall for stiffening and stabilizing a rear end of the spacer element and for fixing the spacer element to a front end of a bumper beam during use; and
   the rear base wall comprises at least one opening allowing passage into at least one channel of at least one cable or wire during use.

7. The spacer element of claim 6, further comprising a rear fixing component for fixing the spacer element to the front end of the bumper beam.

8. The spacer element of claim 1, wherein:
   each channel comprises at least one outer lateral wall that is not shared with another channel and at least one side wall that is common to an adjacent channel;
   the at least one outer lateral wall extends in a direction above or below a left-to-right dimension of the spacer element; and
   the at least one outer lateral wall is at least 5 mm in length to evenly distribute an impact among the channels during use.

9. The spacer element of claim 1, wherein the polygonal shape is selected from the group consisting of hexagonal with rounded corners, pentagonal with rounded corners, square with rounded corners, and triangular with rounded corners.

10. The spacer element of claim 1, wherein:
    the polymeric material has an ultimate elongation of above 50% of an initial length of a sample that undergoes a tensile test; and
    the polymeric material is selected from the group consisting of polypropylene, polyethylene, thermosetting polyurethane, thermoplastic rubber, a polymer alloy of a polycarbonate with an ABS polymer or with polybutylene terephthalate, a polymer alloy having a polybutylene base, and a polymer alloy having a polybutylene terephthalate base.

11. A bumper structure for a vehicle, comprising:
the spacer element of claim 1;
a metal crossbeam; and
an outer polymer bumper casing;
wherein:
at least a portion of the crossbeam in a left-to-right direction has a substantially "Ω" shaped cross section; and
the spacer element is positioned and compressed between the outer polymer bumper casing and the crossbeam to at least partially absorb energy during impact and to stiffen the crossbeam during use.

12. An apparatus comprising at least one mold having a shape configured to produce the spacer element of claim 1.

13. An engine-powered vehicle, comprising at least one spacer element of claim 1.

14. The engine-powered vehicle of claim 13, comprising:
an engine;
a passenger compartment;
at least three wheels; and
a bumper structure;
wherein the at least one spacer element is provided in the bumper structure

\* \* \* \* \*